United States Patent [19]

Suzuki

[11] Patent Number: 5,757,108
[45] Date of Patent: May 26, 1998

[54] MOTOR

[75] Inventor: Ryuji Suzuki, Yokohama, Japan

[73] Assignee: Canon Kabushiki Kaisha, Tokyo, Japan

[21] Appl. No.: 609,743

[22] Filed: Mar. 1, 1996

[30] Foreign Application Priority Data

Mar. 3, 1995 [JP] Japan .................. 7-070647

[51] Int. Cl.⁶ .................. H02K 5/00; H02K 1/06; H02K 37/12
[52] U.S. Cl. .................. 310/49 R; 310/216; 310/217; 310/89; 310/91; 310/258; 310/67 R
[58] Field of Search .................. 310/216, 217, 310/49 R, 89, 91, 67 R, 254, 258, 259

[56] References Cited

U.S. PATENT DOCUMENTS

| | | | |
|---|---|---|---|
| 4,603,273 | 7/1986 | McDonald | 310/89 |
| 4,780,953 | 11/1988 | Wheeler et a l. | 29/596 |
| 5,043,613 | 8/1991 | Kurata et al. | 310/49 R |
| 5,075,150 | 12/1991 | Webb et al. | 428/162 |
| 5,113,107 | 5/1992 | Atsumi et al. | 310/256 |
| 5,142,178 | 8/1992 | Kloster et al. | 310/217 |
| 5,218,252 | 6/1993 | Iseman et al. | 310/64 |

*Primary Examiner*—Steven L. Stephan
*Assistant Examiner*—Michael J. Wallace, Jr.
*Attorney, Agent, or Firm*—Fitzpatrick, Cella, Harper & Scinto

[57] ABSTRACT

An electromagnetic drive apparatus comprises a stator yoke excited with supply of power to a coil, a rotor arranged as capable of being driven by excitation of the stator yoke so as to move a driven member, and a fixed member for positioning and supporting the rotor and the stator yoke. The stator yoke has a projecting portion or a recessed portion and the stator yoke is positioned and supported relative to the fixed member by the projecting portion or the recessed portion to provide a compact motor without causing a drop of efficiency in the power of the motor.

7 Claims, 4 Drawing Sheets

MOTOR

BACKGROUND OF THE INVENTION

1. Field of the Invention

The present invention concerns a motor assembled without degrading motor performance. More particularly, the invention relates to a motor having a configuration suitable for a compact of motor and suitably applicable for example to lens driving motors.

2. Related Background Art

In the case of conventional motors, for example in a stepping motor, a method for positioning a stator yoke thereof to a fixed member was such that a fitting hole was formed in the stator yoke itself and the fitting hole was engaged with a shaft provided on the fixed member to position the stator yoke.

The necessity of positioning the stator yoke relative to the fixed member is to maintain an adequate gap between a rotor and the stator yoke. Dispersion of the gap directly results in degrading the performance and stop accuracy, and, therefore, the position of the stator yoke needs to be precisely determined relative to the fixed member. For that purpose, it is conventional that a fitting positioning hole for a rotating shaft of the rotor and a positioning portion for the stator yoke are formed on the fixed member so as to restrict the dispersion of dimensional accuracy as much as possible.

Meanwhile, miniaturized products are becoming commercially available, which increases demands also to miniaturize the motor itself mounted in such products. A first way for achieving miniaturization of a motor, for example the stepping motor itself, is usually to consider whether it is possible to simply miniaturize the motor configuration presently used as it is. Namely, it is a present status that the motor is designed as being miniaturized in the same positioning structure of the stator yoke to the fixed member as described above and in the same relation between the fitting hole of the stator yoke and the fitting shaft of the fixed member (at the same reduction ratio for the diameter of the shaft, the diameter of the hole, etc.).

However, because the above conventional example employs a structure obtained by miniaturizing the motor configuration presently used as it is in order to miniature the motor, it is considered that the fitting hole for positioning the stator yoke also becomes smaller, and that the positioning shaft of the fixed member to fit in the fitting hole of the stator yoke also becomes slimmer with a decrease an the diameter of the fitting hole.

Moreover, the fixed member is usually a molded part of a mold (for example, polycarbonate) being an insulating member, taking account of processing and cost. Thus, there is a limit (in view of molding and strength) to decreasing the diameter of the shaft for miniaturization as described above, and there occurs some cases that the diameter of the shaft of the fixed member cannot follow a miniaturization rate of the motor. In such cases, a method employed is to design the size of the shaft of the fixed member for positioning the stator yoke so as not to be decreased relative to the miniaturization of the motor. This is explained referring to FIG. 4 and FIG. 5.

FIG. 4 is a drawing to show a configuration of a conventional stepping motor, and FIG. 5 is a drawing to show a configuration of a compact model of the conventional stepping motor. In FIG. 4, 101, 102 denote stator yokes, 103 a rotor, and 104, 105 coils. In FIG. 5, 111, 112 designate stator yokes, 113 a rotor, and 114, 115 coils. In FIG. 4 and FIG. 5, 101a, 102a, 111a, 112a are positioning fitting holes of respective stator yokes relative to the fixed member, and the diameters of the four holes are the same.

Next explained are magnetic circuits in such states. First, chain double-dashed lines in FIG. 4 and FIG. 5 represent magnetic paths. As shown in FIG. 4, the magnetic paths are closed as passing through the inside of the stator and rotor. The stepping motors presently available are realized in that state. Changing this configuration into the one shown in FIG. 5 for miniaturization, the magnetic paths would run across the positioning holes of the stator yokes 111, 112, and thus, the magnetic circuits are closed so as to pass through the inside of the stator yokes 111, 112 as avoiding the positioning holes 111a, 112a.

However, because a rate of an area occupied by the positioning hole 111a, 112a of stator yoke 111, 112 to the stator yoke 111, 112 is high, the stator yoke becomes thin in that portion, and it becomes impossible to keep a predetermined quantity of magnetic field passing through that portion. Namely, the stator yokes become magnetically saturated there, so that the motor can supply only the power resulting from passage of magnetic field at the level of magnetic saturation, resulting in a drawback that the efficiency drops.

Another positioning method of stator yokes considered is a method for surrounding the stator yoke itself by the fixed member without perforating the stator yoke, which is poor in space efficiency, thus failing to achieve miniaturization.

SUMMARY OF THE INVENTION

An object of the present invention is to solve the above problems, and thus to provide a motor employing projecting portions or recessed portions for positioning of the stator yoke, thereby permitting positioning without forming the positioning holes.

Another object of the present invention is to provide a motor arranged in such a manner that the projecting portions or recessed portions for positioning of the stator yoke are also utilized upon lamination of the stator yoke.

Still another object of the present invention is to provide a motor which can be readily produced by employing a common configuration to two stator yokes in the motor.

The other objects of the present invention will be apparent from the specific embodiments described below.

BRIEF DESCRIPTION OF THE DRAWINGS

FIG. 2 is incorporated into a drive apparatus of a stop of lens in a camera;

DESCRIPTION OF THE PREFERRED EMBODIMENTS

The embodiments of the present invention will be explained with reference to the drawings.

Figure 1:
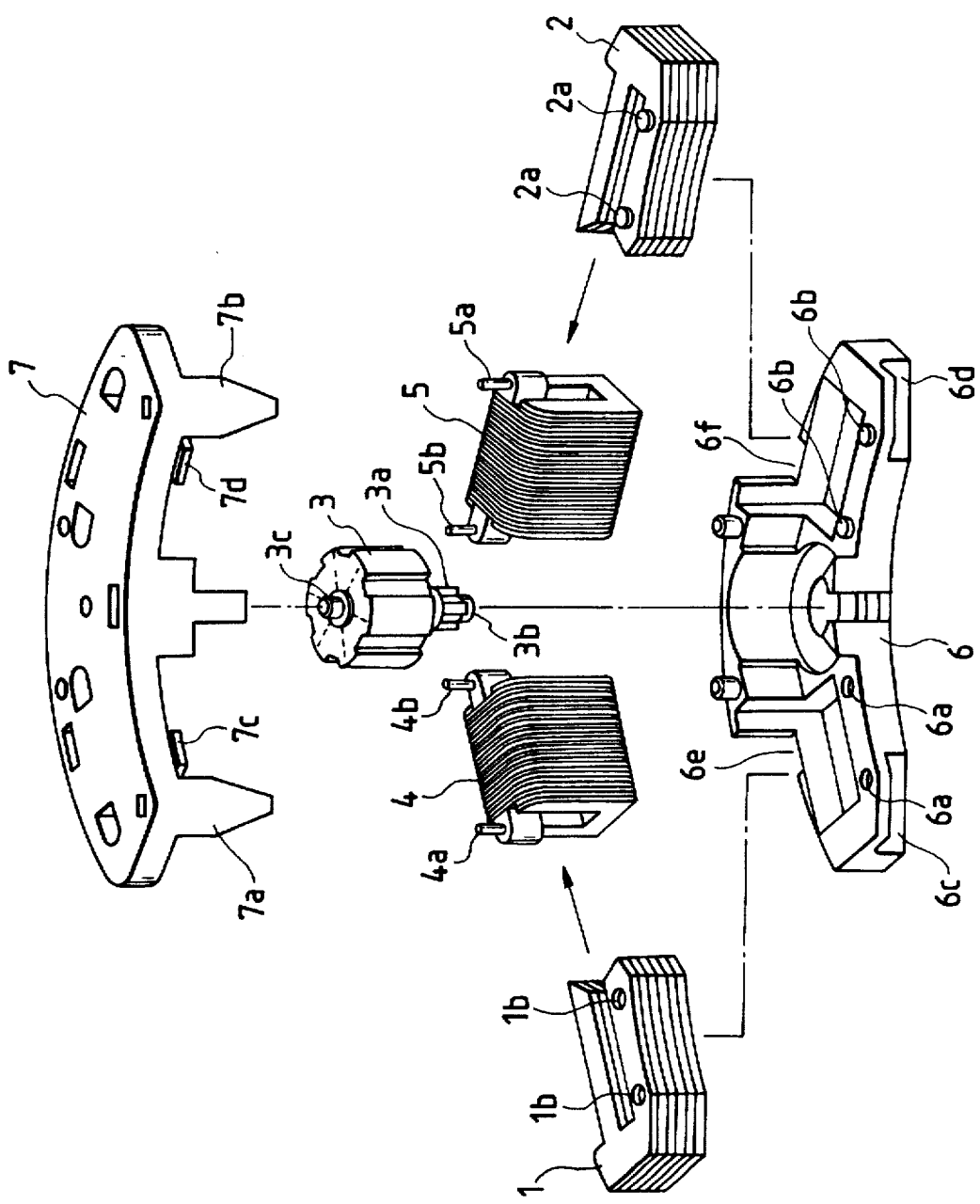
FIG. 1 is an exploded, perspective view of the motor according to an embodiment of the present invention.
Figure 2:
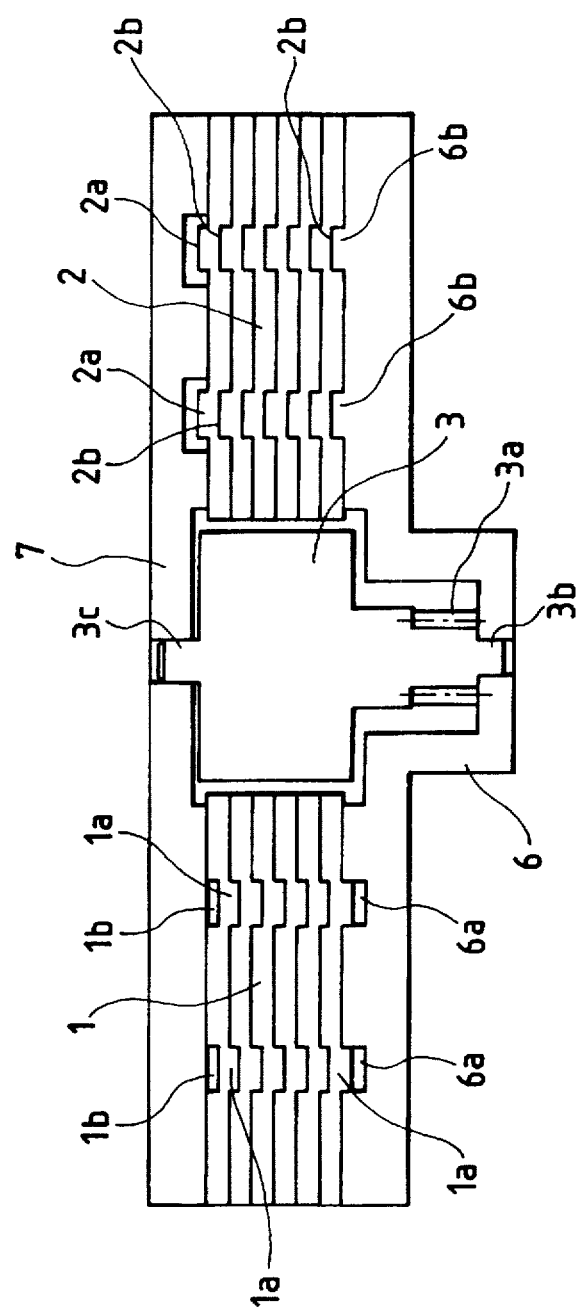
FIG. 2 is a sectional view of the motor shown in FIG. 1.

FIG. 1 is an exploded, perspective view of the stepping motor and FIG. 2 is a sectional view of the motor. In FIG. 1 and FIG. 2, reference numeral 1 designates a stator yoke formed by stacking a plurality of (six) plates of a soft magnetic material and securing them to each other, in which the plates of the soft magnetic material are laminated as a stack of plates in a same shape.

The plates of the soft magnetic material are shaped by press working (half press) so as to form projecting portions 1a on top faces thereof and recessed portions 1b on bottom faces thereof as positioning portions necessary when stacked. Namely, as shown in FIG. 2, the plates of the soft magnetic material are stacked so that their projecting portions 1a may be opposed to the recessed portions 1b. Actually, the projecting portions 1a are pressed into the recessed portions 1b, thereby achieving positioning and also forming a unit of stator yoke 1.

Numeral 2 is a same component as the stator yoke 1, which can be the other stator yoke in the stepping motor of a two-phase type. The stator yoke 2 is nothing but the stator yoke 1 turned over. Therefore, projecting portions 2a correspond to the projecting portions 1a and recessed portions 2b correspond to the recessed portions 1b.

Numeral 3 denotes a rotor of a plastic magnet, which can be rotated by excitation states of the stator yoke 1 and stator yoke 2, and which is integrally provided with a gear 3a for transmitting the rotating power of the rotor 3 to a driven member (not shown). Numerals 4, 5 represent coils for exciting the stator yoke 1 and stator yoke 2, respectively, and the coil 4 and coil 5 are formed as same parts. The coil 4 and coil 5 are arranged to excite the stator yoke 1 and stator yoke 2, respectively, when the power is supplied thereto through connection terminals 4a, 4b, 5a, 5b.

Numeral 6 stands for a motor case for positioning and supporting the stator yoke 1 and stator yoke 2. Next explained is the positioning and supporting structure of the stator yoke 1 and stator yoke 2 to the motor case 6.

First, the positioning method of the stator yoke 1 to the motor case 6 utilizes the arrangement that the projecting portions 1a used upon stacking of the stator yoke 1 as described above project from the lowermost plate of the soft magnetic material, in which the projecting portions 1a are pressed into recessed portions 6a formed in the motor case 6 so as to achieve positioning and support. On the other hand, the positioning method of the stator yoke 2 to the motor case 6 utilizes the arrangement that the lowermost plate of the soft magnetic material has the recessed portions 2b in contrast with the case of the stator yoke 1, in which projecting portions 6b formed in the motor case 6 are pressed into the recessed portions 2b so as to achieve positioning and support.

Figure 5:
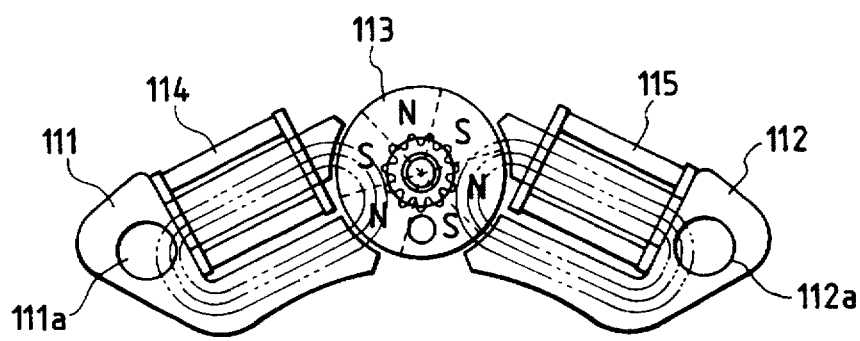
FIG. 5 is a drawing to show the configuration of a compact model of the conventional motor shown in FIG. 4.

Since the positioning and supporting method of the stator yokes 1, 2 to the motor case 6 employs the press-fitting relation between the projecting portions and the recessed portions, the invention can solve the problem occurring in the positioning and supporting method of the perforated stator yokes in the conventional example of FIG. 5 as discussed previously; that is, the invention can avoid the magnetically saturated state.

Further, the motor case 6 rotatably supports the rotary shaft 3b of the rotor 3. Namely, the stator yokes 1, 2 and the rotor 3 are positioned with respect to the motor case 6, so that they are set only in a dimensional tolerance relation of only the motor case 6, which can maintain the dispersion of gaps between the rotor 3 and the stator yokes 1, 2, which affects the motor performance very much, at the minimum level, thus realizing a structure that can provide a stepping motor with high accuracy.

Numeral 7 denotes a motor case cap, which rotatably supports the rotary shaft 3c of the rotor 3 and which has claws 7a–7d hooked on grooves 6c–6f of the motor case 6, thereby forming a unit of the stepping motor as an electromagnetic drive apparatus.

(Embodiment 2)

Figure 3A:
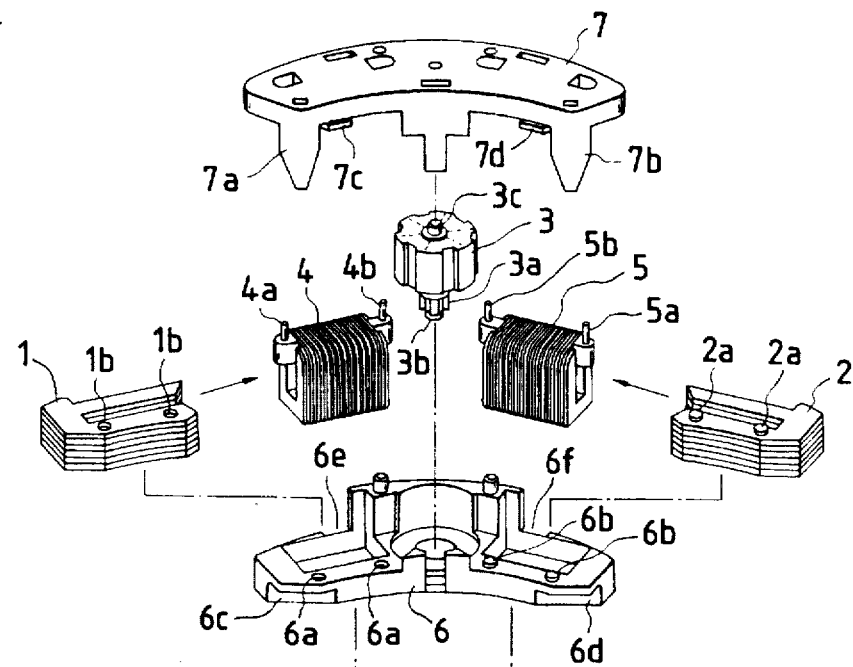
FIG. 3A and FIG. 3B are exploded, perspective views where the motor shown in FIG. 1
Figure 3B:
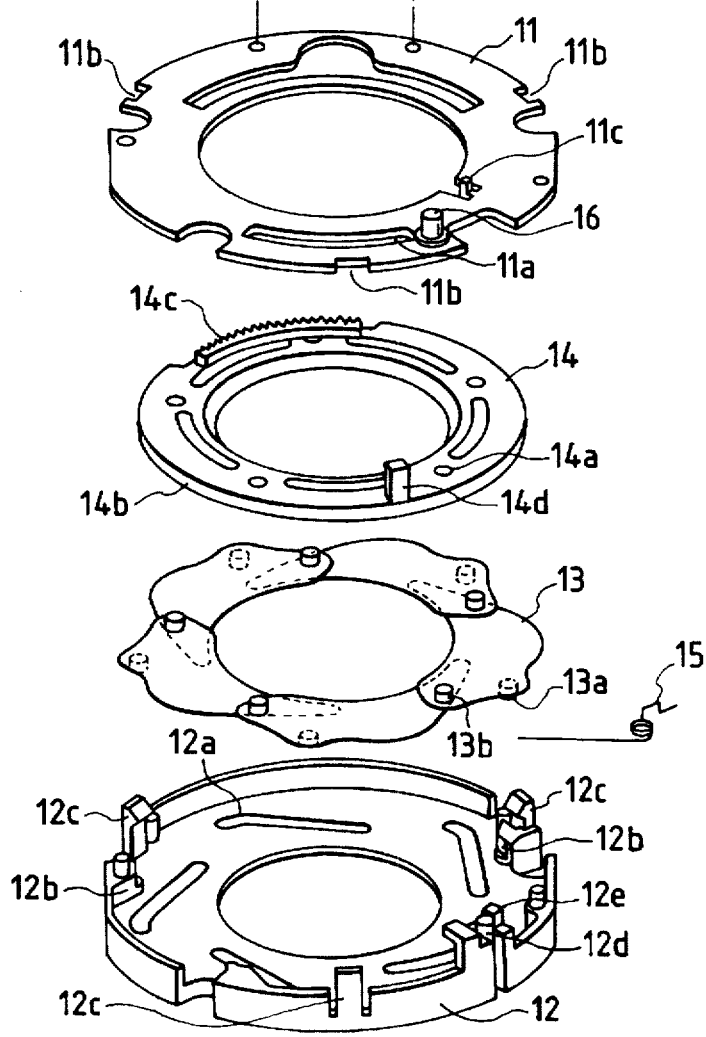
Figure 4:
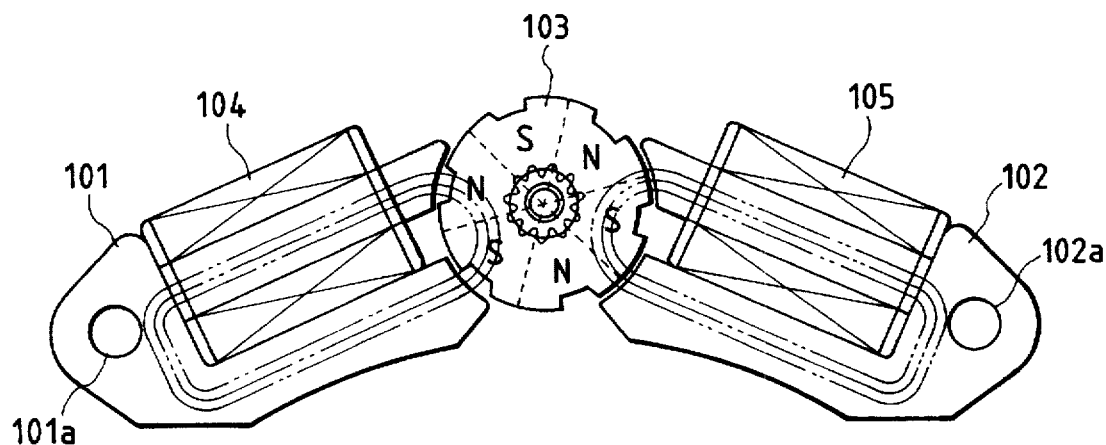
FIG. 4 is a drawing to show the configuration of the conventional motor.

Referring to FIGS. 3A and 3B, Embodiment 2 is next explained as to an electromagnetic drive stop apparatus provided with the motor A in Embodiment 1 as a drive source. In FIGS. 3A, 3B, the stop apparatus is totally denoted by reference symbol B; and the motor A of Embodiment 1 is mounted in the stop apparatus B. The motor A is comprised of the components as explained in Embodiment 1, and, because the configuration of the motor A was already explained, the explanation thereof is omitted in this Embodiment 2.

The configuration of the stop apparatus B is next explained. Reference numeral 11 designates an electrically conductive, annular, base plate, which has an aperture through which photographing light passes, and the electromagnetic drive apparatus (motor) A as described above is fixed by a known method to the annular base plate 11.

Numeral 12 denotes an annular cam plate of an insulating member, and a plurality of known stop cams 12a are cut in the cam plate 12. Numeral 13 represents a plurality of stop wings, and dowels 13a provided on the back faces of the respective stop wings 13 are fitted in the stop cams 12a of the cam plate 12. Numeral 14 stands for a rotary ring arranged to rotate about the optical axis and having an aperture through which the photographing light passes in the center, and top-face dowels 13b of the respective stop wings 13 are fitted in a plurality of holes 14a formed in the rotary ring 14. An outer periphery 14b of the rotary ring 14 is engaged with inner surfaces of separating projections 12b located at three positions on the cam plate 12, so that the ring 14 is rotatably supported by the cam plate 12. The rotary ring 14 has a gear portion 14c, and the gear portion 14c is formed so as to mesh with the gear portion 3a of the magnet rotor 3 in the motor A.

Further, the rotary ring 14 has a protrusion 14d, and the protrusion 14d is set so as to be relatively slidable in an elongated hole 11a formed in the annular base plate 11. The cam plate 12 has three hooks 12c in total, and the hooks 12c are engaged with three notches 11b of the annular base plate 11 so as to sandwich the rotary ring 14, thus forming a unit of the annular base plate 11, cam plate 12, stop wings 13, and rotary ring 14 as the stop apparatus B. This stop apparatus B is provided with a switch for detecting whether the stop is open or not. Numeral 15 represents a spring of an electrically conductive member, which is a component of the switch and which is put in a switch mounting portion 12d integrally formed with the cam plate 12. One end of the spring 15 is engaged with a protrusion 12e of the cam plate 12 and the other end is engaged with a switch pin 16. The switch pin 16 is also an electrically conductive member, which is caulked to the annular base plate 11 so as to be always conductive with the annular base plate 11. Namely, the annular base plate 11 itself becomes electrically grounded because the upright portion 11C is connected to the ground pattern of the base plate which is not shown. A terminal end of the spring 15 is connected to the signal pattern of the base plate. The switch is arranged to detect an electric signal caused by engagement between the spring 15 and the switch pin 16. This contact/non-contact arrangement of the switch is realized by making the protrusion 14d of the rotary ring 14 hit one end of the spring 15 so as to turn the switch off as interrupting the contact between the spring 15 and the switch pin 16 when the stop becomes open. The above describes the configuration of the stop apparatus B.

Next explained is the operation based on the above configuration. When the power is supplied through the connection terminals 4a, 4b, 5a, 5b to the coils 4, 5, magnetic fields are formed in the stator yokes 2, 3 to act with a magnetic field of the magnet rotor 3, thereby forming closed magnetic paths. If the power is not supplied to the coil 5, the magnetic path caused by the coil 4 receiving the power becomes dominant, thereby generating a rotating torque in the magnet rotor 1 (the same can be applied to the case when the power is supplied only to the coil 5). When the power is supplied to the both coils 4, 5, the magnetic paths are similarly formed in the stator yokes 2, 3 to act with the magnet rotor 3, thus giving the rotating torque to the magnet rotor 3. On the other hand, the motor is arranged to perform drive of stepping motor conventionally known by supplying the power to the both coils 4, 5 as successively switching the current directions. This rotation rotates the rotary ring 14 by a predetermined angle through meshing between the gear portion 3a of the magnet rotor 3 and the gear portion 14c of the rotary ring 14. This rotation of the rotary ring 14 moves the top-face dowels 13b of the stop wings 13 in the rotating direction. Then the back-face dowels 13a of the stop wings 13 effect the known stop opening and closing operation by rocking the stop wings 13 in an opening direction or in a closing direction, depending upon a relative relation with the stop cams 12a formed in the cam plate 12, thereby effecting exposure control.

As explained above, the present invention effects the positioning between the stator yokes and the fixed member by the projecting portions or recessed portions formed in the stator yokes per se, which can suppress occurrence of magnetic saturation, which used to be caused in the conventional motors in the positioning and supporting arrangement of the perforated stator yokes with the shafts of the fixed member, resulting the making of the regions around the holes of the stator yokes thinner. Therefore, the present invention is free of degradation of motor performance and is effective for forming a compact motor.

The present invention is arranged to effect positioning between the stator yokes and the fixed member by utilizing the positioning members for positioning the plurality of plates of the soft magnetic material, necessary for stacking of the laminated stator yokes, also for positioning the stator yokes with respect to the fixed member, thus presenting an effect to provide an electromagnetic drive apparatus (motor) that can achieve miniaturization in a simple configuration without degrading the motor performance, different from the magnetic saturation generating structure of the stator yokes in the conventional positioning method of the perforated stator yokes.

Further, the present invention employs a common arrangement to the both stators in a two-phase motor in which the positioning method between the fixed member and the stator yokes includes positioning with the projecting portions of one stator yoke and positioning with the recessed portions of the other stator yoke relative to the fixed member (in the structure of stator yokes in which one can obtain by turning the other over), which can realize the common arrangement of two stator yokes, thus obviating a need to newly prepare two different stator yokes, and which can expect an effect of cost reduction.

The present invention can achieve an actuator fully ready for recent miniaturization of products by applying the configuration of the motor having a above effects to the stop apparatus in optical devices and mounting it in the products.

What is claimed is:

1. A motor comprising:
   a rotor having a rotating shaft;
   a stator yoke having a tip portion opposed to said rotor, said stator yoke being formed as a lamination of a plurality of plates of a soft magnetic material, each of said plurality of plates of the soft magnetic material having both a projecting portion and a recessed portion, each said plate having one of said projecting portion and recessed portion on a top face of said plate and having the other of said projecting portion and recessed portion on a back face of said plate, each said plate being stacked and fitted with the others of said plurality of plates to achieve the lamination of said plurality of plates;
   a coil wound around said stator yoke, said coil exciting said stator yoke to drive said rotor;
   a motor case for supporting the rotating shaft of said rotor and also supporting said stator yoke, said motor case having either a projecting portion or a recessed portion which fits with a respective projecting portion or recessed portion of an outermost plate of said plurality of plates of the soft magnetic material to position said stator yoke relative to said motor case.

2. The motor according to claim 1, wherein said motor is a two-phase type motor and said stator is comprised of a first stator yoke and a second stator yoke.

3. The motor according to claim 2, further comprising a motor case cap, wherein said motor case and said motor case cap are formed in an arcuate shape, and wherein said first stator yoke and said second stator yoke are positioned in said motor case and are arranged opposed to each other about said rotor.

4. A two-phase type stepping motor comprising:
   a rotor having a rotating shaft;
   a stator yoke having a tip portion opposed to said rotor and comprising a first stator yoke and a second stator yoke, wherein said first stator yoke and said second stator yoke are arranged in an inverted relation, each having a same configuration with both a projecting portion and a recessed portion, wherein each of said first stator yoke and said second stator yoke has one of said projecting portion and said recessed portion on one surface thereof, and the other of said projecting portion and recessed portion on the other surface thereof;
   a coil wound around said stator yoke, said coil exciting said stator yoke to drive said rotor;
   a motor case for supporting the rotating shaft of said rotor and for supporting said stator yoke, said motor case having both a projecting portion and a recessed portion, wherein a projecting portion or a recessed portion of the first stator yoke is fitted in a respective one of the projecting portion and recessed portion of said motor case and a projecting portion or recessed portion of the second stator yoke is fitted in the other respective projecting portion or recessed portion of said motor case, thereby effecting positioning of said first stator yoke and said second stator yoke relative to said motor case; and
   a motor case cap for supporting the rotating shaft of said rotor, said motor case cap engaging said motor case.

5. A lens driving motor comprising:
   a stop apparatus having a driving mechanism for driving a stop;
   a rotor having a rotating shaft provided with a transmitting portion interlocked with said driving mechanism;

a stator yoke having a tip portion opposed to said rotor, said stator yoke being formed as a lamination of a plurality of plates of a soft magnetic material, each of said plurality of plates of the soft magnetic material having both a projecting portion and a recessed portion, each said plate having one of said protecting portion and recessed portion on a top face of said plate and having the other of said protecting portion and recessed portion on a back face of said plate, said projections and recessed portions being fitted with respective projections and recessed portions of adjacent ones of said plurality of plates to form a lamination of the plurality of plates;

a coil wound around said stator yoke, said coil exciting said stator yoke to drive said rotor;

a motor case supporting the rotating shaft of said rotor and supporting said stator yoke, said motor case having either a projecting portion or recessed portion that fits with a respective projecting portion or recessed portion of an outermost plate of said plurality of plates of the soft magnetic material, to position said stator yoke relative to said motor case; and a motor case cap that supports the rotating shaft of said rotor, said motor case cap engaging said motor case.

6. A motor comprising:

a rotor having a rotating shaft;

a stator yoke having a tip portion opposed to said rotor, said stator yoke being formed as a lamination of a plurality of plates of a soft magnetic material, each of said plurality of plates of soft magnetic material having both a projecting portion and a recessed portion, each said plate having one of said projecting portion and recessed portion on a top face of said plate and having the other of said projecting portion and recessed portion on a back face of said plate, the projections and recessed portions being fitted with respective projections and recessed portions of adjacent ones of said plurality of plates to form a lamination of the plurality of plates;

a coil wound around said stator yoke, said coil exciting said stator yoke to drive said rotor; and a support member that supports the rotating shaft of said rotor and supports said stator yoke, said support member having either a projecting portion or a recessed portion that fits with a projecting portion or recessed portion of an outermost plate of said plurality of plates of soft magnetic material to position said stator yoke relative to said motor case.

7. A motor comprising an electromagnetic drive apparatus comprising: a stator yoke comprising a first stator yoke and a second stator yoke, each formed as a lamination of a plurality of plates of a soft magnetic material, said stator yoke being excitable with supply of power to a coil; a rotor capable of being driven by excitation of said stator yoke, thereby moving a driven member; a fixed member for position and supporting said rotor and said stator yoke; wherein the plates of the soft magnetic material constituting said stator yoke each have positioning portions for lamination, said positioning portions are arranged to effect positioning and lamination of the plurality of plates, and the positioning portions are also arranged to effect positioning and support relative to said fixed member and wherein said positioning portions provided in the plates of the soft magnetic material constituting said stator yoke comprise projecting portions formed by press working or the like on top faces thereof and recessed portions formed by press working or the like on back faces thereof, the plurality of plates of the soft magnetic material with said projecting portions and recessed portions are laminated so as to match the projecting portions with respective recessed portions, thereby forming the stator yoke, one of said first stator yoke and said second stator yoke being positioned and supported by projecting portions relative to said fixed member, and the other of said first stator yoke and said second stator yoke being positioned and supported by recessed portions relative to said fixed member.

* * * * *